United States Patent [19]

De Clippeleir et al.

[11] Patent Number: 4,582,818

[45] Date of Patent: Apr. 15, 1986

[54] HALOGEN-CONTAINING ALUMINA CATALYSTS PREPARED FROM ALUMINA OF AT LEAST 99% PURITY

[75] Inventors: Georges E. M. J. De Clippeleir; Raymond M. Cahen, both of Brussels, Belgium

[73] Assignee: Cosden Technology, Inc., Dallas, Tex.

[21] Appl. No.: 727,196

[22] Filed: Apr. 29, 1985

Related U.S. Application Data

[63] Continuation of Ser. No. 189,431, Sep. 22, 1980, abandoned.

[51] Int. Cl.$^4$ .................. B01J 27/125; C07C 2/02
[52] U.S. Cl. ................................. 502/231; 585/533
[58] Field of Search ............... 585/533, 526; 502/231

[56] References Cited

U.S. PATENT DOCUMENTS

| | | | |
|---|---|---|---|
| 3,248,450 | 4/1966 | Goble | 252/442 |
| 3,268,618 | 8/1966 | Fletcher et al. | 252/442 |
| 3,558,737 | 1/1971 | Saines | 585/533 |
| 3,607,959 | 9/1971 | Estes et al. | 252/442 |
| 4,051,017 | 9/1977 | Beaty, Jr. | 252/463 |
| 4,140,773 | 2/1979 | Stowell et al. | 252/463 |
| 4,288,649 | 9/1981 | McCaulay | 585/533 |

*Primary Examiner*—P. E. Konopka

*Attorney, Agent, or Firm*—John K. Abokhair; M. Norwood Cheairs

[57] ABSTRACT

A halogen-containing alumina catalyst for the polymerization of olefins to liquid polymers containing a major proportion of polymers having a molecular weight higher than the trimers, said catalyst selectively polymerizing isobutene from a mixture of butenes to produce liquid polyisobutene having a molecular weight higher than about 280; said catalyst containing from about 2 to about 20 wt. % chlorine, bromine or a mixture thereof, and being prepared from an alumina having a purity of at least 99% and a surface area greater than about 150 m$^2$/g with at least 10% of the pores having a diameter higher than about 200 Å; said preparation being effected by contacting the alumina with a dry gaseous stream comprising a halogenation agent consisting essentially of volatile chlorinated and/or brominated saturated oliphatic organic compound having a vapor pressure of at least 100 mm of Hg at a temperature of 200°–230° C. and having a low hydrogen content, together with a non-reducing gaseous carrier at a temperature from about 230° to about 300° C. during a period of time t in hours such that the ratio t/R, wherein R is the mole ratio of gaseous carrier to halogenation agent, ranges between about 0.35 and about 20.

8 Claims, No Drawings

HALOGEN-CONTAINING ALUMINA CATALYSTS PREPARED FROM ALUMINA OF AT LEAST 99% PURITY

This application is a continuation of application Ser. No. 189,431, filed Sep. 22, 1980 abandoned.

TECHNICAL FIELD

This invention relates to halogen-containing alumina catalysts which are employed for the polymerization of olefins to liquid polymers. It relates also to a method for the preparation of these catalysts.

BACKGROUND OF THE INVENTION

Halogen-containing alumina catalysts are used for the alkylation of alkanes with olefins to produce high octance gasoline blending components and for the isomerization of hydrocarbons. These catalysts have also been suggested for the polymerization of olefins. They can be prepared by contacting alumina materials with various halogen-containing reagents. Calcined aluminas are generally used as starting material, but halogenation of uncalcined alumina prior to calcination has also been suggested. Various halogen-containing reagents may also be used, such as chlorine or bromine or their mixtures with chlorinated derivatives of low molecular weight hydrocarbons. Methods for preparing these catalysts are disclosed in U.S. Pat. Nos. 2,479,110; 2,642,384; 3,240,840; 3,523,142; 3,549,718; 3,646,152; 3,689,434; 3,702,293; 3,702,312 and 4,083,800.

However when employed for polymerizing olefins, these alumina catalysts yield only lower molecular weight polymers. Moreover, when used for polymerizing feeds comprising mixed butenes, these catalysts give copolymers containing large amounts of poly-n-butenes and small amounts of polyisobutenes.

Liquid polyolefins are now employed as additives in lubricating oils, insulating oils or even as substituents for lubricating oils. But, these liquid polyolefins must have a molecular weight higher than the dimers and trimers. For example, liquid polyisobutenes of formula $(C_4H_8)_n$ where n usually lies between about 5 and 70 are particularly required for these uses.

There is, therefore, a need for a catalyst allowing to obtain liquid polyolefins having a molecular weight higher than the trimers. There is also a need for a catalyst which allows the selective polymerization of isobutene from a feed containing mixed butenes, with formation of liquid polymers.

SUMMARY OF THE INVENTION

It is an object of the present invention to provide an improved halogen-containing alumina catalyst.

Another object of the present invention is to provide an alumina catalyst for producing liquid polyolefins higher than trimers.

A further object of the present invention is to provide an alumina catalyst for producing liquid polyisobutenes having a molecular weight higher than about 280.

Yet another object of this invention is to provide an alumina catalyst for the selective polymerization of isobutene contained in a feed stream of mixed butenes and which must fulfill specific conditions for this specific reaction.

It is also an object of the present invention to provide a method for the preparation of this improved alumina catalyst.

In accordance with the present invention, it has been found that halogen-containing alumina catalysts which are particularly suited for the polymerization of olefins to liquid polymers having a molecular weight higher than the trimers contain from about 2 to about 20% by weight of a halogen selected from the group consisting of chlorine, bromine and mixtures thereof, and are prepared from alumina having a purity of at least 99% and a surface area greater than about 150 m$^2$/g with at least 10% of the pores having a diameter larger than 200 Å.

These halogen-containing alumina catalysts can be prepared by a process which comprises the following steps:

(a) contacting a dried alumina having a purity of at least 99% and a surface area greater than about 150 m$^2$/g with at least 10% of the pores having a diameter larger than 200 Å, with a dry gaseous stream comprising
  (i) a halogenation agent which is selected from the group consisting of volatile chlorinated saturated aliphatic organic compounds, volatile brominated saturated aliphatic organic compounds and mixtures thereof, having a vapor pressure of at least 100 mm. $H_g$ at a temperature of 200°-230° C. and having a low hydrogen content; and
  (ii) a non-reducing gaseous carrier;
  at a temperature ranging from about 230° to about 300° C. during a period of time t in hours such that the ratio t/R, wherein R is the molar ratio of gaseous carrier to halogenation agent, ranges between about 0.35 and about 20, with formation of a halogen-containing alumina;

(b) heating the halogen-containing alumina under a dry and non-reducing atmosphere, at a temperature comprised between about 250° and 500° C., and (c) recovering a halogen-containing alumina catalyst containing from about 2 to about 20 wt. % halogen and free from aluminium trihalide.

DETAILED DESCRIPTION OF THE INVENTION

The catalyst is prepared from alumina having a purity of at least 99%. That means an alumina wherein the total content of impurities and more particularly the total content of $SiO_2$, $Na_2O$, Fe compounds and S compounds is lower than 1 wt. %. It has been unexpectedly found that some or all of these impurities lead to polymers containing high amounts of dimers and trimers. Alumina having a purity of 99.5% and higher are particularly suitable.

Any of the forms of pure alumina customarily employed in catalysts may be used, but, in particular, eta and gamma alumina are used. It has been found that the catalyst material is highly active and selective when the surface area of the alumina before halogenation is at least about 150 m$^2$/g. Aluminas having a surface area greater than about 200 m$^2$/g and which may reach about 350 m$^2$/g have been found convenient.

The pore distribution of the alumina before chlorination is also an important feature. At least 10% of the pores must have a diameter larger than 200 Å. For example, polyisobutenes having a low content of dimers and trimers are produced when the catalyst used has been prepared from an alumina wherein at least 20% of the pores have a diameter larger than 200 Å. Alumina wherein the diameter of the pores exceeds about 150,000–200,000 Å are less suitable as they yield polymers having excessively high molecular weights.

It has also been found that high yields of suitable polyolefins are obtained when the alumina has a total pore volume of at least about 0.25 ml/g before chlorination. However, catalyst materials exhibiting excessively large total pore volumes possess a low strength. For these reasons, the total pore volume of the alumina before chlorination is preferably within the range of about 0.6 to about 1.2 ml/g.

Before halogenation, the absorbed water in the alumina is removed by a heat treatment at a temperature which does not exceed 600° C. This treatment is advantageously carried out by drying the alumina under an atmosphere of non-reducing gas, such as nitrogen, carbon dioxide, oxygen and mixtures thereof. According to an embodiment of this invention, a reaction vessel is loaded with alumina to maximum capacity in order to avoid any free volume and therefore to avoid water readsorption during the further cooling. The reaction vessel is rapidly heated to a temperature which generally ranges from about 300° to about 500° C.

Halogenation of the alumina is then carried out at a temperature ranging from about 230° C. to about 300° C., and preferably from about 250° C. to about 300° C. It has been found that a halogen-containing alumina catalyst prepared at lower temperature is less selective and does not promote the production of poly-isobutenes. On the other hand, the halogenation leads to the formation of unwanted high amounts of aluminium trihalide and to less active and less selective catalysts when it is carried out at temperatures higher than about 300° C. The halogenation reaction is exothermic and the temperature must therefore be carefully controlled to maintain it within the above limits.

Halogenation of the alumina is undertaken by contacting the alumina with a gaseous stream comprising a halogenation agent and a non-reducing gaseous carrier. It has been found that this treatment must be undertaken under specific conditions in order to obtain halogenated alumina catalysts which use not only active but also selective for the considered specific use.

One of these conditions is the choice of the halogenation agent. This agent is preferably a volatile chlorinated or brominated saturated aliphatic organic compound having a vapor pressure of at least 100 mm $H_g$ at a temperature of about 200°–230° C. A halogenated compound having a vapor pressure of about 300 to 400 mm $H_g$ or even more in this temperature range is preferably used. Moreover, volatile chlorinated or brominated saturated aliphatic organic compounds having a low hydrogen content are active halogenation agents. Halogenation compounds having a high ratio of halogen to carbon and wherein the amount of halogen atoms is higher than the amount of hydrogen atoms on each carbon of these typically comprise X atoms of carbon, where X may vary between 1 and 4, Y atoms of chlorine and/or bromine, Z atoms of hydrogen, and may contain oxygen. Y must be higher than Z not only in the halogenation agent but also on each atom of carbon of this agent. Halogenated paraffins containing from 1 to 4 carbon atoms, and halogenated ethers containing from 2 to 4 carbon atoms and which fulfill the above condition with respect to the volatility and the amount of halogen atoms are particularly suitable halogenation agents for producing the alumina catalysts of the present invention. Typical examples of halogenated paraffins are carbon tetrachloride or tetrabromide, chloroform, bromoform, hexachloro- and pentachloroethane. Di-trichloromethyl ether, di-pentachloroethyl ether and brominated homologs are applicable halogenation agents. Of the above mentioned compounds, carbon tetrachloride and di-trichloromethyl ether are particularly suitable halogenation agents. Contrarywise, molecular chlorine or bromine and hydrogen chloride or hydrogen bromide are less effective halogenation agents. Catalysts prepared by treating an alumina according to the present invention with a halogenation system comprising these latter materials alone or in admixture with other halogenation agents do not promote the selective polymerization of isobutene contained in a mixture of butenes.

The non-reducing gaseous carrier which can be used is generally nitrogen, carbon dioxide, oxygen or mixtures thereof. According to another specific feature of the process of this invention, the contacting time t in hours between the alumina and the halogenation mixture should be correlated with the mole ratio R between the gaseous carrier and the halogenation agent. Final catalysts characterized by a high activity and selectivity are obtained when the ratio t/R ranges between about 0.35 and about 20. Smaller values will lead to less selective catalysts, while higher values are not used from an economic standpoint. Particularly attractive results have been obtained by halogenating alumina under conditions such that this ratio t/R ranges from about 2 to about 15.

The total amount of halogenation agent to be used and the contacting period with the alumina are also correlated in order to produce an alumina catalyst containing from about 2% to about 20% by weight of chlorine and/or bromine. The preferred halogen content of the catalyst depends upon many factors, such as for example the surface area of the alumina. Moreover, in many cases, the greater the halogen content, the higher is the activity of the catalyst. However, it has been found that highly active catalysts are generally less selective for the considered polymerization reaction. For these reasons, the halogen content is suitably within the range of about 4% to about 15% by weight. It is generally desirable to produce a catalyst containing at least about 5 halogen atoms per 100 square Å, when the catalyst is employed for the selective production of polyisobutenes from a feed containing mixed butenes.

Advantageously, the halogen-containing alumina is thereafter freed from any formed aluminum trihalide. In accordance with an embodiment of this invention, this treatment is undertaken by heating the halogen-containing alumina under a dry and non-reducing atmosphere at a temperature which may vary between about 250° C. and 500° C. This heating is preferably carried out at a temperature ranging from about 275° C. to about 350° C. under a flowing stream of non-reducing gas such as nitrogen, carbon dioxide, oxygen and their mixtures.

If the catalyst is not produced in situ in the polymerization reactor, the purified alumina catalyst is unloaded from the halogenation vessel and is introduced into containers. Care must be taken to prevent humidity pick-up by the catalyst. These steps are generally undertaken under an atmosphere of dry gas, such as for example nitrogen. A convenient way to perform the unloading of the halogenation vessel and the filling of the containers consists in flooding said vessel with a dry oil, for example a dry white oil, the oil level being above the catalyst level. The catalyst and the oil are withdrawn at the bottom of the vessel and are introduced into the containers under a nitrogen blanket.

The catalysts prepared by the present process can be produced in any shape known in the art, such as for example in pellet, granular, powder or bead form. The catalysts are characterized by two main features:

their selectivity, for producing polyisobutenes having a molecular weight higher than about 280 from a feed containing isobutene in admixture with other butenes, and their long term activity, which exceeds 2000 hours before regeneration.

The regeneration step may be easily undertaken in situ in the polymerization reactor by calcination of the catalyst at a temperature from about 400° to about 600° C. The calcined catalyst is then halogenated according to the process of this invention.

In order to more fully illustrate the features of this invention, the following non-limiting examples are presented.

EXAMPLE 1

A chlorided alumina was prepared from a gamma alumina having the following characteristics:
purity: 99.83 wt. % $Al_2O_3$
specific surface area: 270 $m^2/g$
total pore volume: 0.82 ml/g
percentage of pores having a diameter larger than 200 Å: 42.5%

The alumina was dried by treatment at 500° C. under a stream of nitrogen with a GHSV (gaseous hourly space velocity) of 375 liters per liter of alumina and hour.

Chlorination of the dried alumina was then carried out under the following conditions:
chlorination agent: $CCl_4$ (LHSV or liquid hourly space velocity=0.21)
gaseous carrier: $N_2$ (GHSV=375)
mole ratio $N_2/CCl_4$: 7.8
chlorination time: 18 hours
ratio t/R: 2.3
temperature: 300° C.

The chlorided alumina was thereafter heated at 300° C. for 1 hour under a stream of nitrogen with a GHSV=375. It contained 8.3 wt. % chlorine.

This catalyst was evaluated for its activity and selectivity in the polymerization of isobutene.

A feed containing
iso-butane: 27–31 wt. %
n-butane: 7.0–9.5 wt. %
1-butene: 16–19 wt. %
isobutene: 22–24 wt. %
cis-2-butene: 5–10 wt. %
trans-2-butene: 14–16 wt. %
was passed upflow, in liquid phase, through a fixed bed of this catalyst. The LHSV of the feed was 1, the mean temperature during the run was 1.5° C. and the total pressure was 6 kg/cm².

It was found that 82% of the isobutene contained in said feed was polymerized with production of 76.3% polyisobutene having a molecular weight of 2104. That means a selectivity towards the formation of heavy polymers of 93%.

By way of comparison, the following experiments have been carried out.

COMPARATIVE EXPERIMENT A

A catalyst was prepared as described in the above Example 1, but with a ratio of t/R of only 0.14

The selectivity was 31%.

COMPARATIVE EXPERIMENT B

The same experiment as in Example 1 was carried out, but with an alumina having a purity of 94.9%. The polymerization temperature was 11° C.

The formation of light polymers was more significant and the selectivity was only 68.1%.

COMPARATIVE EXPERIMENT C

The procedure described in Example 1 was repeated, but with the use of $Cl_2$ (GHSV: 22) as chlorination agent and of $O_2$ (GHSV: 22) as diluent gas, at 400° C.

The chlorided alumina had a chlorine content of 2.7%.

The selectivity was 7.3%.

COMPARATIVE EXPERIMENT D

The alumina of Example 1 was used for preparing a chlorided alumina.

After a drying step as described in Example 1, the alumina was then treated by a gaseous mixture of HCl (20 vol. %) and $N_2$ (80 vol. %), at a GHSV=109, at 300° C. for 9 hours.

The chlorided alumina was heated and was thereafter tested as described in Example 1.

The selectivity was only 10.8%.

EXAMPLE 2

A chlorided alumina was prepared from a gamma alumina having the following characteristics:
purity: 99.2%
specific surface area: 295 $m^2/g$
total pure volume: 0.45 ml/g
percentage of pores having a diameter higher than 200 Å: 15.5%

The alumina was dried by treatment at 500° C. under a stream of nitrogen (GHSV: 410) for 20 hours.

Chlorination of the dried alumina was carried out under the following conditions:
chlorination agent: $CCl_4$ (LHSV: 0.2)
gaseous carrier: $N_2$ (GHSV: 410)
mole ratio R: 8
chlorination time t: 18 hours
temperature: 300° C.
ratio t/R: 2.25

The chlorided alumina was thereafter heated to a temperature of 300° C. under a stream of nitrogen (GHSV: 410) for 1 hour. It contained 9.8 wt. % of chlorine.

This catalyst has been tested by using the procedure described in Example 1. The selectivity was 92.7%.

EXAMPLE 3

The same experiment as described in Example 2 was carried out, but with the use of $CHCl_3$ (LHSV: 0.07) as chlorination agent.

The ratio t/R was 0.71.

The chlorine content of the chlorided alumina was 7.5 wt. %.

The selectivity of this catalyst was 87.8%.

EXAMPLE 4

A gamma alumina having the characteristics given in Example 1 was dried at 500° C. for 18 hours under a stream of dry $N_2$ at a GHSV of 560 liters by liter of alumina and hour.

Bromination of the dried alumina was then carried out under the following conditions:
bromination agent: $CHBr_3$ (LHSV=0.065)
gaseous carrier: $N_2$ (GHSV=560)
mole ratio $N_2/CHBr_3$: 33.6
bromination time: 18 hours
ratio t/R: 0.54
temperature: 300° C. The brominated alumina was thereafter heated to 300° C. for 1 hour under a stream of nitrogen (GHSV=560). It contained 16.8 wt. % Br.

This catalyst was active for the polymerization of isobutene.

EXAMPLE 5

A gamma alumina having the characteristics given in Example 1 was dried at 300° C. for 18 hours under a stream of air (GHSV: 410).

Chlorination of the dried alumina was then carried out under the following conditions:
chlorination agent: $CCl_4$ (LHSV=0.22)
gaseous carrier: air (GHSV=410)
mole ratio air/$CCl_4$: 7.9
time: 18 hours
ratio t/R: 2.28
temperature: 300° C.

The chlorinated alumina was thereafter heated to a temperature of 300° C. for 4 hours under a stream of air (GHSV: 410).

It contained 9.1 wt. % Cl.

It was evaluated as described in Example 1. Its selectivity was 87%.

EXAMPLE 6

The experiment of Example 5 was repeated, but with the use of $CO_2$ instead of air and at a temperature of 500° C. during the drying step and during the final heating.

The obtained alumina catalyst contained 7.5 wt. % Cl. Its selectivity was 76.2%.

What is claimed is:

1. A halogen-containing alumina catalyst for the polymerization of olefins to liquid polymers containing a major part of polymers having a molecular weight higher than the trimers, said catalyst containing from about 2 to about 20 wt. % of a halogen selected from the group consisting of chlorine, bromine and mixtures thereof, and being prepared from an alumina having a purity of at least 99% and a surface area greater than about 150 $m^2/g$ with at least 10% of the pores having a diameter higher than about 200 Å, said catalyst selectively polymerizing isobutene from a mixture of butenes to produce liquid polyisobutene having a molecular weight higher than about 280.

2. The catalyst of claim 1, wherein the surface area of the alumina ranges from about 200 $m^2/g$ to about 350 $m^2/g$.

3. The catalyst of claim 1, wherein at least 20% of the pores of the alumina have a diameter higher than about 200 Å.

4. The catalyst of claim 3, wherein at least 20% of the pores have a diameter ranging from about 200 Å to about 150,000 Å.

5. The catalyst of claim 1, wherein the alumina has a total pore volume of at least 0.25 ml/g before halogenation.

6. The catalyst of claim 5, wherein the alumina has a total pore volume ranging from about 0.6 to about 1.2 ml/g before halogenation.

7. The catalyst of claim 1, wherein said catalyst contains at least about 5 halogen atoms per 100 square Å.

8. A halogen-containing alumina catalyst for the selective polymerization of isobutene from a mixture of butenes with production of liquid polyisobutene having a molecular weight higher than about 280, said catalyst containing from about 4 to about 15 wt. % of halogen and being prepared from an alumina having a purity of at least 99% and a surface area greater than about 150 $m^2/g$ with at least 10% of the pores having a diameter higher than about 200 Å.

* * * * *